March 26, 1940.   R. G. WIARD   2,195,347

WEEDLESS FISHHOOK

Filed Sept. 15, 1939

R. G. Wiard
INVENTOR.

BY Knowles,
ATTORNEYS.

Patented Mar. 26, 1940

2,195,347

UNITED STATES PATENT OFFICE 2,195,347

WEEDLESS FISHHOOK

Robert G. Wiard, Ypsilanti, Mich.

Application September 15, 1939, Serial No. 295,132

4 Claims. (Cl. 43—39)

This invention relates to fishhooks, the primary object of the invention being to provide means for guarding the usual fishhook against being fouled by hooking into grass, weeds or other foreign matter, while the hook is being used in fishing.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
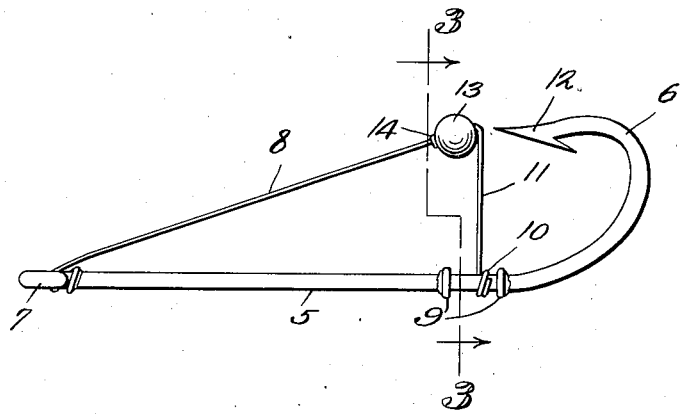
Figure 1 is a side elevational view of a hook equipped with a guard constructed in accordance with the invention.
Figure 2:
Figure 2 is a plan view thereof.

Referring to the drawing in detail, the fishhook embodies the usual shank 5 and hook portion 6, the shank 5 being provided with the usual eye 7, through which the fishing line to which the hook is connected, is extended.

The guard forming the subject matter of the present invention, includes a length of wire indicated at 8, one end thereof being bent around the shank 5 of the hook, adjacent to the eye 7. The opposite end of the wire is bent around the shank 5, at a point adjacent to the hook 6, as clearly shown by Figure 1 of the drawing. Stops indicated at 9 are also formed on the shank portion 5 of the hook and are disposed on opposite sides of the coiled end 10 of the guard, restricting movement of the guard, longitudinally of the shank 5.

As clearly shown by Figure 1 of the drawing, the wire of which the guard is constructed, is bent in such a way as to provide an angular portion and a portion 11 disposed at an angle of 60 degrees.

The construction of the guard is such that the point of bending between the portions 8 and 11 of the guard will lie directly in front of the spear portion 12 of the hook.

Positioned on the guard, is an enlargement 13 which may be in the form of a ball, the member 13 being held on the section 8 of the wire guard, by means of the stop 14, which is secured to the guard. Thus it will be seen that due to this construction, the guard which is disposed directly in front of the spear portion of the hook, will guard the hook against grass or other foreign matter collecting thereon. It might be further stated that the guard will also prevent the hook from catching into stationary objects such as stones found on the beds or rivers or streams, and which would prevent the hook from being withdrawn or pulled from the body of water in which the hook has been cast.

Figure 3:
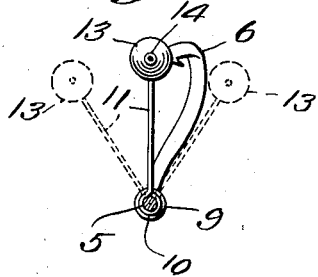
Figure 3 is a sectional view taken on line 3—3 of Figure 1.

The wire material of which the guard is constructed, is such that the guard may swing laterally to positions as shown in dotted lines in Figure 3 of the drawing, when a fish attempts to remove the bait positioned on the hook.

What is claimed is:

1. The combination with a fishhook including a shank and hook section, of a guard comprising a length of wire material having one end thereof secured to the free end of the shank of the hook, said wire material being extended outwardly from the shank of the hook at an angle of substantially 60 degrees with respect to the shank of the hook, the opposite end of the wire material extending inwardly and having connection with the shank of the hook adjacent to the hook portion thereof, stops on the shank of the hook and adapted to be engaged by said wire restricting movement of the guard in one direction, and a member secured on the wire material adjacent to the hook end of the hook.

2. The combination with a fishhook having a shank portion and a hook portion, of a guard comprising a length of wire material, one end of the guard being secured to the free end of the shank portion of the hook, said wire material extending outwardly from the shank portion and being disposed adjacent to the hook portion, the opposite end of the wire material extending laterally and being secured to the shank adjacent to the hook portion, a stop on the wire material, and a member positioned on the guard at a point between the stop and laterally extended portion of the wire for guarding the hook portion of the fishhook.

3. The combination with a fishhook, of a guard comprising a length of wire material having one end thereof secured to one end of the shank of the fishhook and extended outwardly therefrom, the opposite end of the length of wire material being extended laterally and secured to the shank adjacent to the hook end of the fishhook, and spaced stops on the shank of the fishhook and between which the last mentioned end of the length of wire is positioned, restricting movement of the laterally extended end of the length of wire material longitudinally of the shank, and said guard being adapted to move laterally with respect to the hook end of the fishhook.

4. The combination with a fishhook having a shank portion and a hook portion, of a guard embodying a length of wire material having one end thereof secured to the shank portion adjacent to the free end thereof, said length of wire material extending laterally from the shank portion, the opposite end of the length of wire material extending laterally and being secured to the shank of the fishhook adjacent to the hook end thereof, and a ball-shaped member on the guard and disposed adjacent to the hook end of the fishhook, guarding the hook end.

ROBERT G. WIARD.